United States Patent
Charmat et al.

(10) Patent No.: US 7,637,361 B1
(45) Date of Patent: Dec. 29, 2009

(54) COMBINED RETAINER AND ANCHOR FOR FLOATING SHOE DRUM BRAKE

(75) Inventors: Djamel Charmat, South Bend, IN (US); Stefan U. Anger, Oxford, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/241,155

(22) Filed: Sep. 30, 2008

Related U.S. Application Data

(63) Continuation of application No. 12/192,167, filed on Aug. 15, 2008.

(51) Int. Cl.
*F16D 51/00* (2006.01)
(52) U.S. Cl. .................. 188/341; 188/78; 188/325; 188/328
(58) Field of Classification Search .............. 188/341, 188/78, 216, 325, 327, 328, 331, 333, 340
See application file for complete search history.

(56) References Cited

U.S. PATENT DOCUMENTS

| | | | |
|---|---|---|---|
| 4,216,850 A | * | 8/1980 | Kizaki ................. 188/216 |
| 5,360,086 A | | 11/1994 | Charmat |
| 5,553,691 A | | 9/1996 | Mery et al. |
| 5,630,486 A | | 5/1997 | Maligne |
| 6,131,708 A | * | 10/2000 | Fujiwara .............. 188/250 E |

* cited by examiner

*Primary Examiner*—Melanie Torres
(74) *Attorney, Agent, or Firm*—Maginot, Moore & Beck

(57) ABSTRACT

A one-piece sheet metal combination retainer and anchor for use in a non-servo floating shoe drum brake assembly (10) having a pair of laterally extending ears (62, 64, 94, 96) for axially retaining respective ends (22, 24) of a pair of brake shoes (12, 14), and a pair of rivet head reinforceable axially extending portions (58, 60, 82, 84) for anchoring the brake shoe ends during brake application. A base portion (50, 88) has one or more rivet (54, 56, 86, 90) or shaft (92) receiving apertures with the each of the axially extending portions abutted by a rivet head flat surface (70). The base portion has a transversely extending central region (76, 98) to provide, in conjunction with a brake assembly backing plate (52), a parking brake cable (80) retaining clamp.

14 Claims, 4 Drawing Sheets

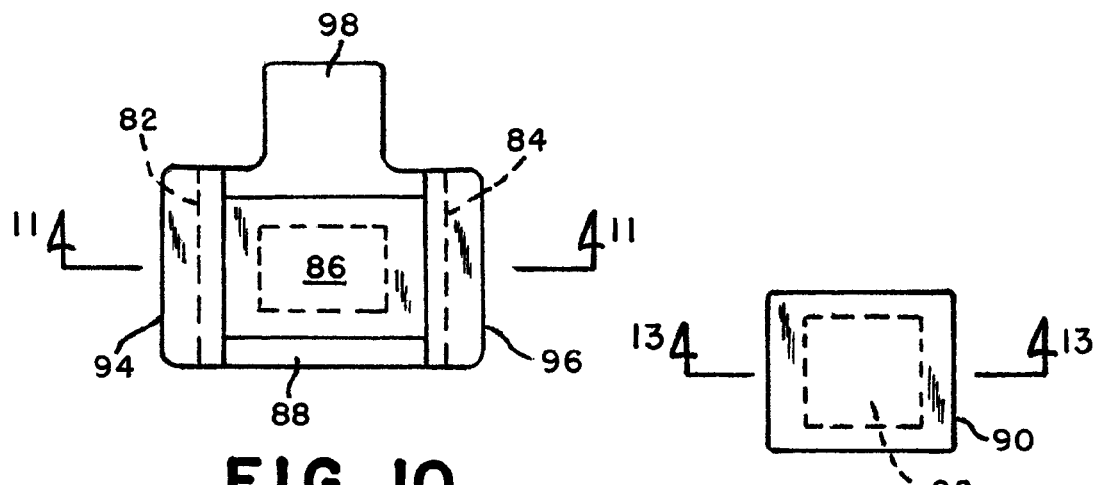
FIG. 10
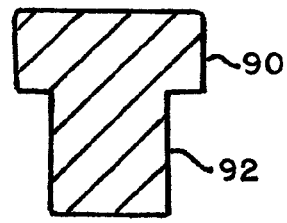
FIG. 12
FIG. 13
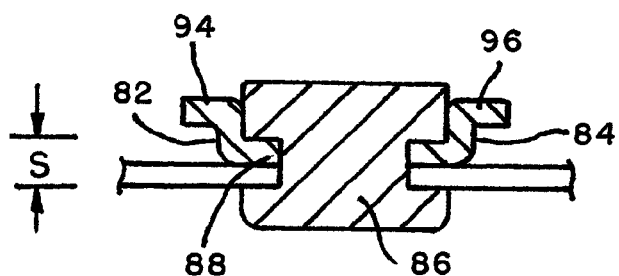
FIG. 11

COMBINED RETAINER AND ANCHOR FOR FLOATING SHOE DRUM BRAKE

BACKGROUND OF THE INVENTION

1. Field of the Invention

The present invention relates to vehicle braking systems and more particularly to improvements in drum brakes of a non-servo floating shoe.

2. Description of the Related Art

Drum brakes are well known and generally include a hollow cylindrical drum fixed to and rotatable with a vehicle wheel about a wheel axle axis and a non-rotating backing plate fixed to the vehicle supporting a hydraulic actuation device constituting the main brake motor. The hydraulic actuation device normally includes a wheel cylinder having two pistons that slide in a bore and defining between them a sealed chamber in which a rise in pressure causes separation of the pistons forcing the brake shoes into contact with the drum to attenuate rotation thereof. A drum brake may also include a mechanical actuation device to provide parking brake or emergency brake functions. First and second brake shoes are movably mounted on the backing plate each having a web and a rim with the rims having opposite the drum inner surface faces bearing friction linings. The hydraulic actuation device acts on a first end of the web of each shoe to press the friction linings against the drum. In some drum brake implementations, the brake shoes are pivotably attached to the backing plate or otherwise mechanically articulated. In floating shoe implementations, the shoes are be slidably mounted on the backing plate and a bearing component secured to the backing plate acts as a bearing surface for second ends of the webs of each shoe.

The bearing component may take the form of a block or anchor fixed to a raised portion of the backing plate, for example, by rivets. In the literature such backing plates are also referred to as carrier or support plates. Typically, there is a retainer extending laterally beyond the block to prevent axial movement of the shoe web away from the block. The retainer is normally fixed to the block by the same rivets which join the block to the support plate. Typical floating shoe drum brakes are shown, for example, in U.S. Pat. Nos. 5,360,086; 5,553,691; and 5,630,486. It is desirable to reduce the cost of producing a floating shoe drum brake.

SUMMARY OF THE INVENTION

The present invention provides a reduced cost retainer which, when backed by one or more mounting rivets, provides a brake shoe anchor and also functions to clamp a mechanical brake cable in place. The retainer may be a purchased item with the rivet(s) pressed in as an assembly.

The invention comprises, a drum brake of the type having a hollow cylindrical drum fixed to and rotatable with a vehicle wheel about a wheel axle axis. A support or backing plate is irrotatably fixed to the vehicle with a pair of brake shoes each having a web and a rim movably mounted on the support plate. Each shoe rim has opposite the drum inner surface a face bearing a friction lining. A hydraulic actuation device, e.g., a wheel cylinder, is capable of acting on a first end of the web of each shoe to press the friction linings against the drum while a bearing component is secured to the support plate and capable of acting as a bearing surface for a second end of the web of each shoe. The bearing component has a relatively flat base fixed to the support plate with a pair of lugs extending from opposed respective base ends generally parallel to one another and away from the support plate. A pair of cantilevered retainer tabs extend from respective lug ends opposite the base laterally away from one another. There is at least one fastener, e.g., one or more rivets, passing through the base and the support plate with a fastener head having at least one surface juxtaposed with a corresponding lug for reinforcing the lug against force applied thereto by a shoe second end during braking.

In another form, the invention includes a brake component for use as an anchor in a non-servo floating shoe drum brake assembly having a sheet metal retainer with a relatively flat base portion, a pair of opposed upstanding end walls, and a pair of flange portions extending from respective end walls laterally away from one another generally parallel to and spaced from the base portion. At least one fastener fixes the retainer to a brake assembly backing plate. A fastener includes a head having at least one generally flat surface for engaging and reinforcing a corresponding retainer end wall against force applied thereto during braking.

An advantage of the present invention is that the need for the anchor block is eliminated.

Another advantage is the scrap steel center part of the backing plate may be used to form the retainer.

A further advantage is the utilization of the retainer which is reinforced by one or more square head rivets to act as an anchor.

BRIEF DESCRIPTION OF THE DRAWINGS

FIG. 10 is a side elevation view similar to FIG. 5, but showing a modification of the combination retainer and anchor;

FIG. 11 is a cross-sectional view along lines 11-11 of FIG. 10;

FIG. 12 is a top view of a rivet suitable for use in FIGS. 10 and 11; and

FIG. 13 is a cross-sectional view along lines 13-13 of FIG. 12.

Corresponding reference characters indicate corresponding parts throughout the several drawing views.

DETAILED DESCRIPTION OF THE INVENTION

Figure 1:
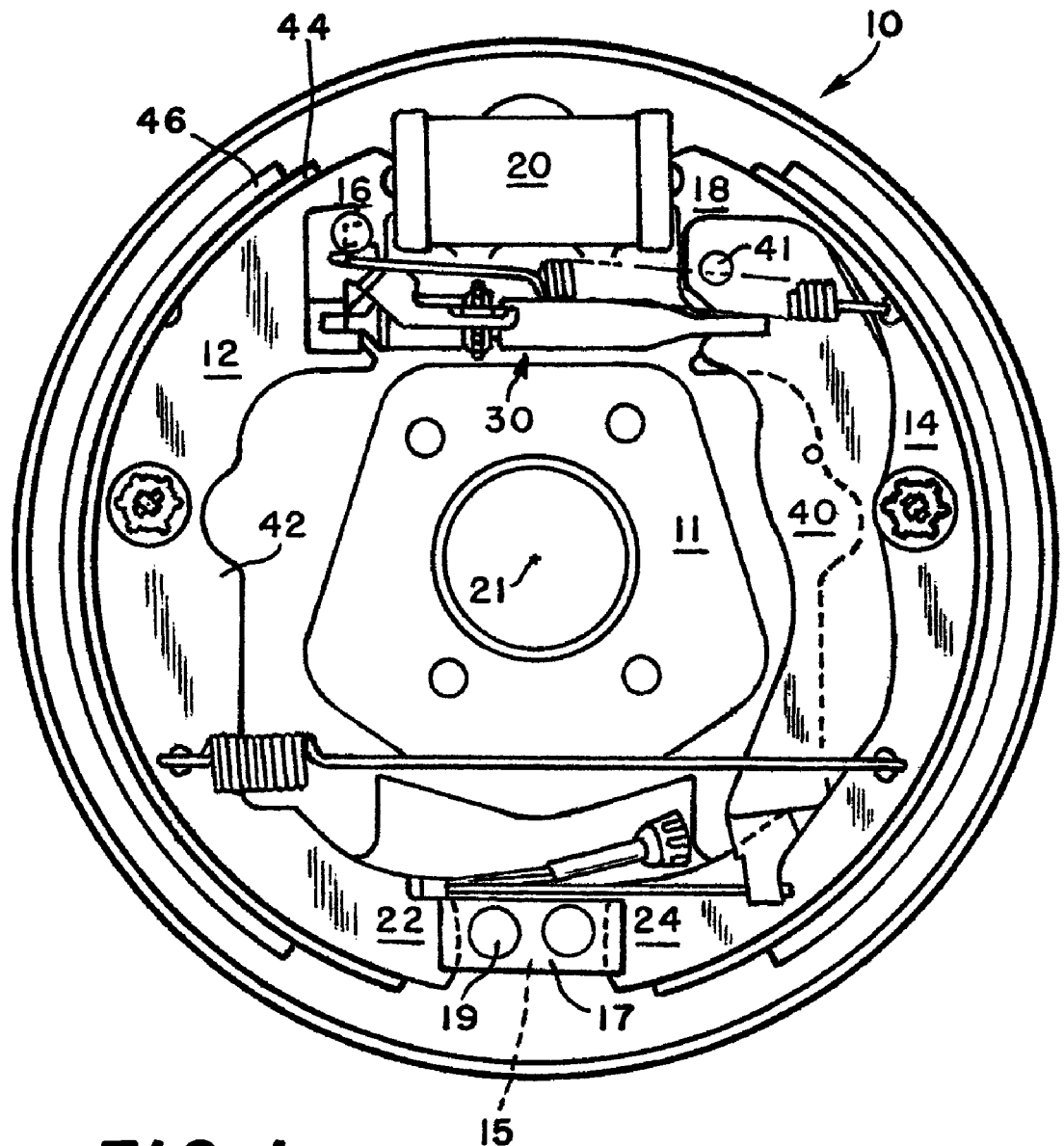
FIG. 1 is a side elevation view of a prior art drum brake assembly with the vehicle wheel and the drum removed.
Figure 3:
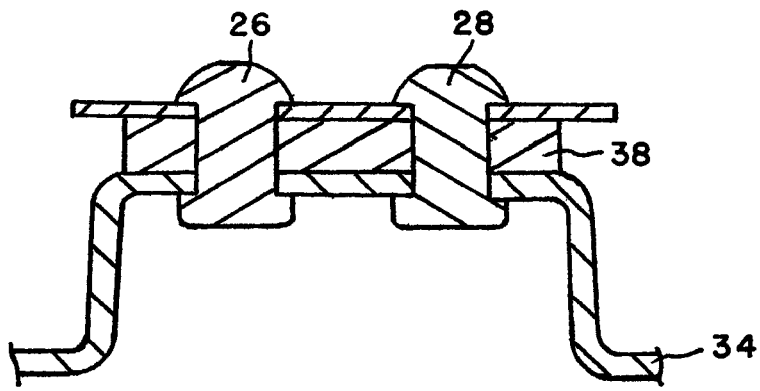
FIG. 3 is a cross-sectional view along lines 3-3 of FIG. 2.

Referring now to the drawings and particularly to FIG. 1, there is shown the mechanism within a drum of a drum brake assembly described more completely in U.S. Pat. No. 5,360,086. Drum brake 10 includes a pair of drum brake shoes 12 and 14 that are mounted on a backing plate 11. Drum brake shoes 12 and 14 have a first pair of drum brake shoe with ends 16 and 18 engaging wheel cylinder or actuation means 20. The first pair of drum brake shoe ends 16 and 18 have a strut member or wear adjuster 30 extending there between. Backing plate 11 includes axial extension or domed region (similar to those seen in FIGS. 3 and 4) having attached thereto an anchor block 15 and brake shoe retainer 17 by means of rivets 19. A second pair of drum brake shoe ends 22 and 24 that engage anchor block 15 are retained axially in place by shoe retainer 17. Each brake shoe includes a web 42 and a rim 44 with each rim having opposite the drum inner surface a face bearing a friction lining 46. The hydraulic actuation means 20 acts on a first end of the web of each shoe to press the friction linings against the drum. The bearing component or anchor block 15 which is secured to the support plate acts as a bearing surface for second ends of the webs of each shoe and experiences a substantial compressive force during brake application.

Drum brake 10 provides a service brake application by hydraulic actuation of wheel cylinder or actuation means 20 which moves drum brake shoes 12 and 14 outwardly into engagement with a rotating drum. As will be understood, the brake assembly includes a conventional hollow generally cylindrical drum that is fixed to and rotatable with a vehicle wheel about a wheel axle axis 21. A parking brake application may be effected by the vehicle operator operating a foot or hand brake control (not shown) which displaces a parking brake cable causing parking brake lever 40 to pivot about pin 41. The anchor and retainer structure of a similar drum brake is shown in FIG. 2.

Figure 2:
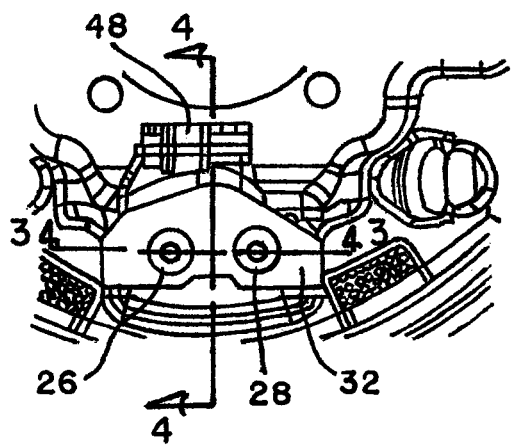
FIG. 2 is a side elevation view of the anchor and retainer region of another prior art drum brake assembly.
Figure 8:
FIG. 8 is a top view of a rivet suitable for use in FIGS. 5-7.

In FIG. 2, a pair of rivets 26 and 28 fix the retainer 32 to backing or support plate 34. Sandwiched between the backing plate 34 and retainer is an anchor block 38 (FIGS. 3 and 4) which is analogous to the anchor block 15 of FIG. 1. A parking brake cable (not shown) is held in place by a parking cable guide 48. A reduction in the number and complexity of these parts as well as simplification of assembly will be discussed in conjunction with FIGS. 5-13.

Figure 5:
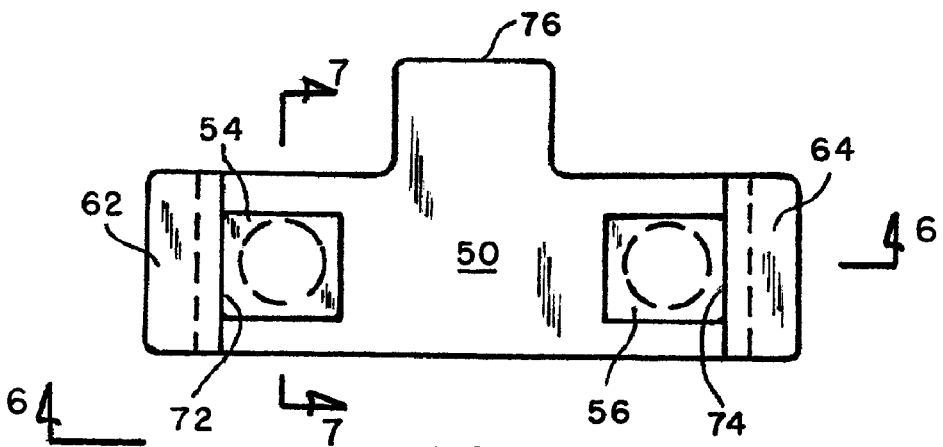
FIG. 5 is a side elevation view of an improved combination retainer and anchor suitable for use in drum brake assemblies such as shown in FIGS. 1-4 according to the present invention.
Figure 6:
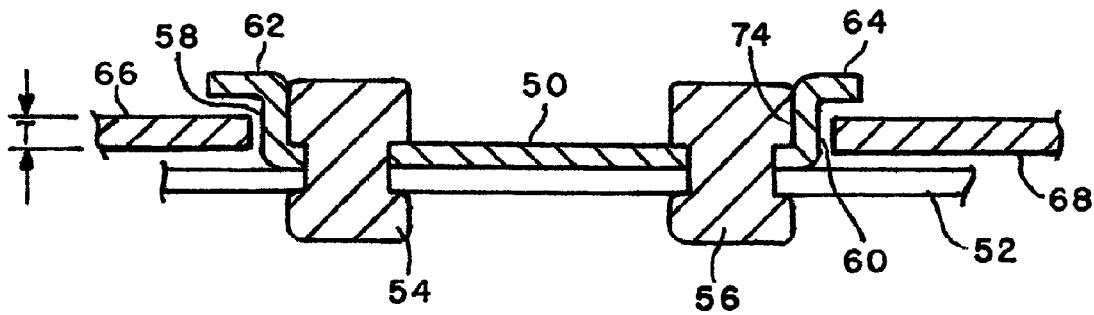
FIG. 6 is a cross-sectional view along lines 6-6 of FIG. 5.

In FIGS. 5 and 6, a one-piece sheet metal combination retainer and anchor suitable according to the invention for use in non-servo floating shoe brake assemblies such as illustrated in FIGS. 1 and 2 includes a relatively flat base 50 fixed to a drum brake backing plate 52 by fasteners such as rivets 54 and 56. The combination retainer/anchor includes a pair of lugs or end walls 58 and 60 extending from opposed respective base ends generally parallel to one another and away from the support or backing plate 52. A pair of cantilevered retainer tabs or ears 62 and 64 extend from respective lug ends opposite the base laterally away from one another overlying the brake shoe web portions 66 and 68. The tabs function as flanges to provide the axial retention function for the floating shoes. The distance from the support plate 52 to each cantilevered tab 62 or 64 is slightly greater than the thickness T of a brake shoe web so that the brake shoes may be held captive axially between the support plate and retainer tab while still having lateral mobility. In addition to passing through the base 50 and the support plate 52 to hold the retainer in place, each rivet includes a head having at least one flat surface 70 (FIGS. 8 and 9) juxtaposed with a corresponding lug as at 72 and 74 for reinforcing the lugs against force applied thereto by the shoe web portions 66 and 68 during braking. In FIGS. 5-9, the fasteners are illustrated as rivets 54 and 56 having heads of a generally square shape providing four potential flat sides or surfaces for reinforcing or backing up a respective lug. The rivet head sides not employed for reinforcement need not be flat, but may be of any convenient shape. The rivet head surface backing the lug may vary somewhat from flat so long as it provides a substantial region of abutment to give the lug enhanced rigidity.

Figure 4:
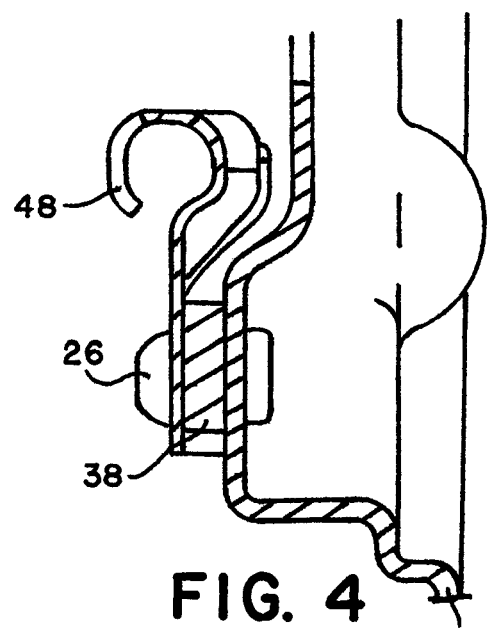
FIG. 4 is a cross-sectional view along lines 4-4 of FIG. 2.
Figure 7:
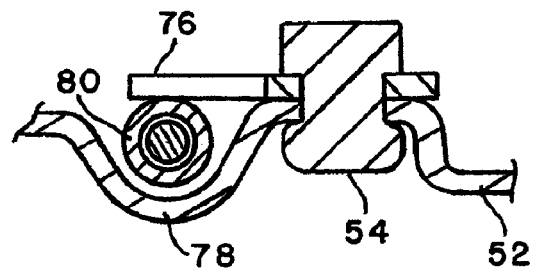
FIG. 7 is a cross-sectional view along lines 7-7 of FIG. 5.
Figure 9:
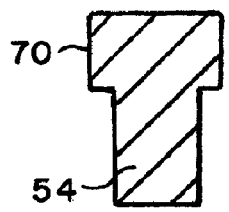
FIG. 9 is a cross-sectional view along lines 9-9 of FIG. 8.

The function of parking brake cable retainer 48 of FIGS. 2 and 4 is now provided by a more simplistic structure shown in FIGS. 5 and 7. The base 50 includes a transversely extending central region 76 providing in, conjunction with the dimple or depression 78 in the support plate, a clamp for retaining a parking brake cable 80. The parking cable guide tab extends from the retainer toward the center of the backing plate.

In FIGS. 10 and 11, the enhanced rigidity of lugs 82 and 84 comes from a single fastener 86 head which spans the base 88 and has two generally parallel flat surfaces each engaging a corresponding lug. In FIG. 11, the separation S between the support plate 88 and each cantilevered tab 94 or 96 is slightly greater than the thickness (T in FIG. 6) of a brake shoe web whereby the brake shoes may be held captive axially between the support plate and retainer tab. While base 50 had two rivet receiving apertures, the base portion 88 has a single aperture for receiving a rivet shaft 92 with the head thereof abutting each of the axially extending portions 82 and 84. The rivet shank or shaft was shown as circular in cross-section in FIGS. 5-9 while the shafts of the rivets shown in FIGS. 12 and 13 are rectangular. Either shape may be used so long as the rivet receiving apertures in the base and support are correspondingly shaped. The base 88 includes a transversely extending central region 98 providing, in conjunction with a concave dimple or depression in the support plate, a clamp for retaining a parking brake cable similar to that described in conjunction with FIG. 7. The single rivet 86 is illustrated as having a rectangular head in FIGS. 10 and 11, while a similar rivet 90 suitable for use in the single fastener embodiment may have the head square in shape as illustrated in FIGS. 12 and 13. Of course, the opposed rivet head sides which do not engage the lugs to reinforce them may be of any convenient shape.

Thus, while a preferred embodiment has been disclosed, numerous modifications will occur to those of ordinary skill in this art. Accordingly, the scope of the present invention is to be measured by the scope of the claims which follow.

What is claimed is:

1. A brake component for use as an anchor in a non-servo floating shoe drum brake assembly, comprising:
    a sheet metal retainer having a relatively flat base portion, a pair of opposed upstanding end walls, and a pair of flange portions extending from respective end walls laterally away from one another generally parallel to and spaced from the base portion; and
    at least one fastener for fixing the retainer to a brake assembly backing plate, said fastener including a head having at least one generally flat surface for engaging and reinforcing a corresponding retainer end wall against force applied thereto during braking,
    wherein the base further includes a transversely extending central region providing, in conjunction with the backing plate, a parking brake cable retaining clamp.

2. A brake component for use as an anchor in a non-servo floating shoe drum brake assembly, comprising:
    a sheet metal retainer having a relatively flat base portion a pair of opposed upstanding end walls, and a pair of flange portions extending from respective end walls laterally away from one another generally parallel to and spaced from the base portion; and
    at least one fastener for fixing the retainer to a brake assembly backing plate, said fastener including a head having at least one generally flat surface for engaging and reinforcing a corresponding retainer end wall against force applied thereto during braking,
    wherein the distance from the backing plate to each flange portion is slightly greater than a spanned brake shoe portion whereby the brake shoes may be held captive between the backing plate and corresponding flange portion.

3. The brake component of claim 2, wherein said at least one fastener comprises a flat head solid rivet.

4. The brake component of claim 2, wherein there is only one fastener having a head spanning the base portion and having two generally parallel flat surfaces each engaging a corresponding end wall.

5. The brake component of claim 4, wherein the fastener head is substantially rectangular in cross-section.

6. The brake component of claim 2, wherein there are two fasteners, each passing through the base and the backing plate and each including a head having at least one relatively flat surface juxtaposed with a corresponding end wall for reinforcing the end wall against force applied thereto by a shoe during braking.

7. The brake component of claim 6, wherein each fastener head is substantially square in cross-section.

8. A drum brake comprising a hollow generally cylindrical drum that is fixed to and rotatable with a vehicle wheel about a wheel axle axis; a support plate fixed to the vehicle first and second brake shoes movably mounted on the support plate each of which including a web and a rim, each rim having opposite the drum inner surface a face bearing a friction lining, a hydraulic actuation device capable of acting on a first end of the web of each shoe to press the friction linings against the drum and a bearing component secured to the support plate and acting as a bearing surface of a second end of the web of each shoe, said bearing component comprising:
  a relatively flat base fixed to the support plate and having opposed respective ends;
  a pair of lugs each extending from a corresponding base end generally parallel to one another and away from the support plate;
  a pair of cantilevered retainer tabs extending from respective lug ends opposite the base laterally away from one another; and
  at least one fastener passing through the base and the support plate, said fastener including a head having at least one surface juxtaposed with a corresponding lug for reinforcing the lug against force applied thereto by a shoe second end during braking,
  wherein the distance from the support plate to each cantilevered tab is slightly greater than the thickness of a brake shoe web whereby the brake shoes may be held captive axially between the support plate and respective retainer tabs.

9. The drum brake of claim 8, wherein there is only one fastener having a head spanning the base and having two generally parallel flat surfaces each engaging a corresponding lug.

10. The drum brake of claim 9, wherein the fastener head is substantially rectangular in cross-section.

11. The drum brake of claim 8, wherein there are two fasteners, each passing through the base and the support plate and each including a head having at least one flat surface juxtaposed with a corresponding lug for reinforcing the lug against force applied thereto by a shoe second end during braking.

12. The drum brake of claim 11, wherein each fastener head is substantially square in cross-section.

13. A drum brake comprising a hollow generally cylindrical drum that is fixed to and rotatable with a vehicle wheel about a wheel axle axis; a support plate fixed to the vehicle first and second brake shoes movably mounted on the support plate each of which including a web and a rim, each rim having opposite the drum inner surface a face bearing a friction lining, a hydraulic actuation device capable of acting on a first end of the web of each shoe to press the friction linings against the drum and a bearing component secured to the support plate and acting as a bearing surface of a second end of the web of each shoe, said bearing component comprising:
  a relatively flat base fixed to the support plate and having opposed respective ends;
  a pair of lugs each extending from a corresponding base end generally parallel to one another and away from the support plate;
  a pair of cantilevered retainer tabs extending from respective lug ends opposite the base laterally away from one another; and
  at least one fastener passing through the base and the support plate, said fastener including a head having at least one surface juxtaposed with a corresponding lug for reinforcing the lug against force applied thereto by a shoe second end during braking,
  wherein the base further includes a transversely extending central region providing, in conjunction with the support plate, a parking brake cable retaining clamp.

14. The drum brake of claim 13, wherein the support plate includes a concave cable receiving depression closely adjacent the transversely extending central region.

\* \* \* \* \*